United States Patent
Hozumi et al.

(10) Patent No.: US 8,944,243 B2
(45) Date of Patent: Feb. 3, 2015

(54) BELT TRACKING SYSTEM, MULTI-ROLLER ASSEMBLY AND IMAGE FORMING APPARATUS EMPLOYING SAME

(71) Applicants: Yoshiki Hozumi, Kanagawa (JP); Akira Asaoka, Kanagawa (JP); Yuuji Sawai, Kanagawa (JP); Kazuchika Saeki, Kanagawa (JP)

(72) Inventors: Yoshiki Hozumi, Kanagawa (JP); Akira Asaoka, Kanagawa (JP); Yuuji Sawai, Kanagawa (JP); Kazuchika Saeki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/869,286

(22) Filed: Apr. 24, 2013

(65) Prior Publication Data

US 2014/0008184 A1 Jan. 9, 2014

(30) Foreign Application Priority Data

Jul. 3, 2012 (JP) ................................. 2012-149477

(51) Int. Cl.
*B65G 39/16* (2006.01)
*B65G 15/60* (2006.01)
*G03G 15/16* (2006.01)

(52) U.S. Cl.
CPC ................ *B65G 15/60* (2013.01); *B65G 39/16* (2013.01); *G03G 15/1615* (2013.01); *G03G 2215/00156* (2013.01)
USPC .......................................................... 198/806

(58) Field of Classification Search
USPC .............................. 198/806; 399/165; 226/21
See application file for complete search history.

(56) References Cited

U.S. PATENT DOCUMENTS

| | | | | | |
|---|---|---|---|---|---|
| 4,397,538 | A | * | 8/1983 | Castelli et al. | 399/165 |
| 5,397,043 | A | * | 3/1995 | Blanding | 226/21 |
| 5,471,289 | A | * | 11/1995 | Satoh et al. | 399/328 |
| 7,686,157 | B2 | * | 3/2010 | Murayama | 198/806 |
| 7,810,633 | B2 | | 10/2010 | Okamoto et al. | |
| 7,921,987 | B2 | | 4/2011 | Kitamura | |
| 8,657,104 | B2 | * | 2/2014 | Asaoka et al. | 198/806 |
| 8,733,542 | B2 | * | 5/2014 | Yamaoka | 198/806 |

FOREIGN PATENT DOCUMENTS

| | | |
|---|---|---|
| JP | 2009-186910 | 8/2009 |
| JP | 2009-288426 | 12/2009 |

OTHER PUBLICATIONS

U.S. Appl. No. 13/859,118, filed Apr. 9, 2013.
U.S. Appl. No. 13/859,192, filed Apr. 9, 2013.

* cited by examiner

*Primary Examiner* — William R Harp
(74) *Attorney, Agent, or Firm* — Oblon, Spivak, McClelland, Maier & Neustadt, L.L.P.

(57) ABSTRACT

A belt tracking system for controlling the lateral position of a movable belt entrained about a plurality of generally parallel rollers for moving in a trans-axial direction perpendicular to an axial direction in which the rollers extend parallel to each other includes a roller shaft, a stationary member, a slidable member, and a biasing mechanism. The roller shaft extends outward in the axial direction from an axial end of a specific one of the plurality of generally parallel rollers. The stationary member is fixed in position adjacent to the roller shaft to define a first interfacial surface therealong. The slidable member is co-movably coupled with the roller shaft to define a second interfacial surface therealong inclined relative to the axial direction. The biasing mechanism is connected to the roller shaft to press the slidable member against the stationary member.

14 Claims, 7 Drawing Sheets

BELT TRACKING SYSTEM, MULTI-ROLLER ASSEMBLY AND IMAGE FORMING APPARATUS EMPLOYING SAME

CROSS-REFERENCE TO RELATED APPLICATION

The present patent application claims priority pursuant to 35 U.S.C. §119 from Japanese Patent Application No. 2012-149477, filed on Jul. 3, 2012, which is hereby incorporated by reference herein in its entirety.

BACKGROUND OF THE INVENTION

1. Technical Field

The present invention relates to a belt tracking system, a multi-roller assembly and an image forming apparatus employing the same, and more particularly, to a belt tracking system for controlling the lateral position of a movable belt entrained about a plurality of rollers, and a multi-roller assembly and an image forming apparatus employing the belt tracking system.

2. Background Art

Image forming apparatuses employ various types of movable imaging belts, such as an intermediate transfer belt, a media conveyance belt, and a fixing belt, each of which is entrained about a plurality of generally parallel rollers for moving in a trans-axial direction perpendicular to an axial direction in which the rollers extend parallel to each other.

One problem associated with a multi-roller belt support assembly is that the movable belt occasionally walks or moves laterally in the axial direction due to a lack of parallel alignment between the belt support rollers, which results, for example, from wear and tear of equipment used to rotate the belt support rollers. Such lateral displacement of the belt, if not corrected, would cause breakage or failure of the imaging process where the belt reaches the axial end of the roller and eventually slips off the belt support assembly.

To address this problem, several techniques have been proposed which employ a belt tracking system connected to an axial end of the belt support roller to control the lateral position of the movable belt.

For example, there is known a belt tracking system in which a movable belt is entrained around a steering roller. The steering roller is equipped with a pair of rotary, slidable members each rotatably mounted to an axial end of the roller to define an inclined, conical interfacial surface therealong to slidably contact a stationary member. The system is designed to correct lateral displacement of the belt by tilting the steering roller as the slidable member slides against the stationary member along the inclined interfacial surface where the belt moves laterally outward to the axial end of the roller.

The inventors have recognized that, although generally successful, the belt tracking system that employs sliding contact between the slidable member and the stationary member for tilting the steering roller can fail to work properly where the slidable member occasionally separates from the stationary member due to an external force, such as, for example, tension in the movable belt stretched around the belt supporting roller.

SUMMARY OF THE INVENTION

Exemplary aspects of the present invention are put forward in view of the above-described circumstances, and provide a novel belt tracking system for controlling the lateral position of a movable belt entrained about a plurality of generally parallel rollers for moving in a trans-axial direction perpendicular to an axial direction in which the rollers extend parallel to each other.

In one exemplary embodiment, the belt tracking system includes a roller shaft, a stationary member, a slidable member, and a biasing mechanism. The roller shaft extends outward in the axial direction from an axial end of a specific one of the plurality of generally parallel rollers. The stationary member is fixed in position adjacent to the roller shaft to define a first interfacial surface therealong. The slidable member is co-movably coupled with the roller shaft to define a second interfacial surface therealong inclined relative to the axial direction. The slidable member is slidable against the stationary member along the interfacial surfaces to cause the roller shaft to move in a direction perpendicular to the axial direction as the belt moves laterally outward in the axial direction. The biasing mechanism is connected to the roller shaft to press the slidable member against the stationary member to maintain continuous contact between the first and second interfacial surfaces.

Other exemplary aspects of the present invention are put forward in view of the above-described circumstances, and provide a multi-roller assembly employing the belt tracking system.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, exemplary embodiments of the present patent application are described.

Figure 1:
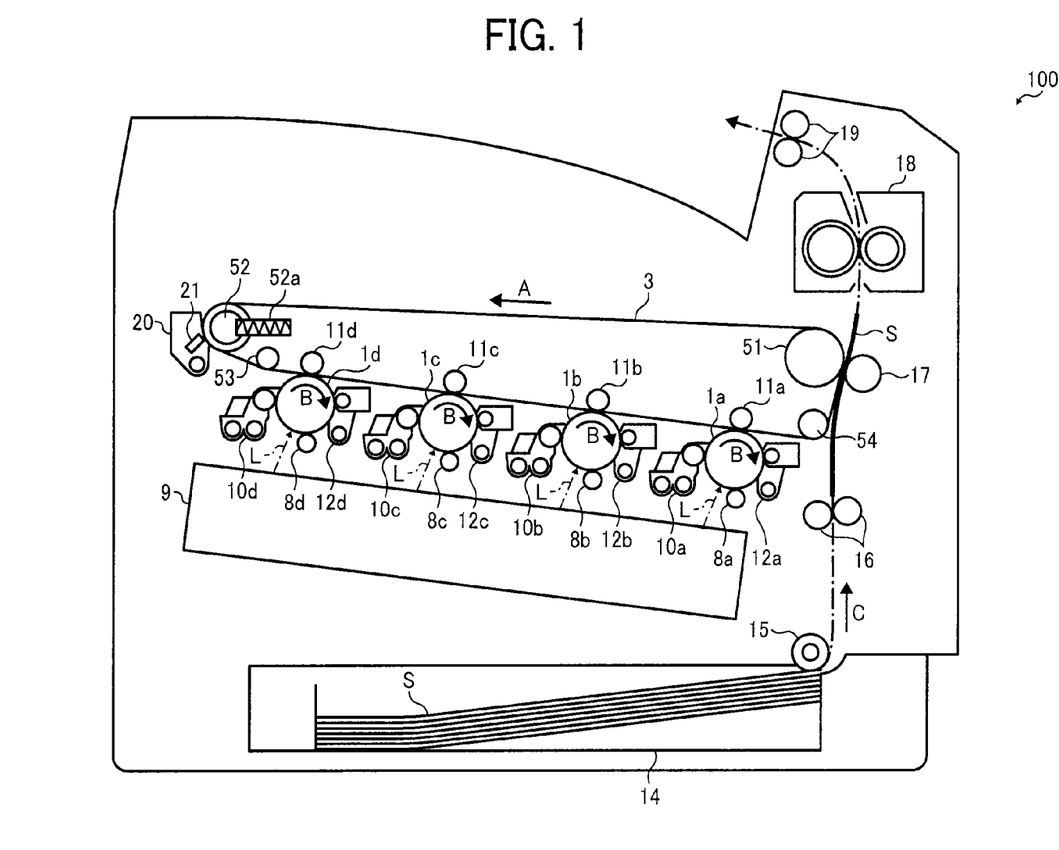
FIG. 1 schematically illustrates an image forming apparatus according to one or more embodiments of this patent specification.

FIG. 1 schematically illustrates an image forming apparatus 100 according to one or more embodiments of this patent specification.

As shown in FIG. 1, the image forming apparatus 100 comprises a tandem color printer that employs four imaging stations, including first through fourth photoconductors 1a, 1b, 1c, and 1d arranged in series, for forming toner images with four different colors: black, magenta, cyan, and yellow. Since the imaging stations are of an identical configuration except for the color of toner used for image formation, features of the photoconductor and its associated imaging equipment described herein apply to all the imaging stations unless otherwise indicated.

In each imaging station, the photoconductor 1 is rotatable in a direction indicated by arrow B, while surrounded by various pieces of imaging equipment, including a discharging device, a charging device 8, a development device 10, and a cleaning device 12, with an exposure device 9 directing a laser beam L to the photoconductive surface, which work in cooperation with each other to form a toner image on the photoconductive surface.

Also included in the image forming apparatus 100 is an intermediate transfer device including an intermediate transfer belt 3 disposed opposite and in contact with the photoconductors 1a, 1b, 1c, and 1d. The intermediate transfer belt 3 is entrained about a plurality of belt support rollers, including a driver roller 51 equipped with a suitable rotary actuator, as well as idler rollers 52, 53, and 54, aligned generally parallel to each other. As the driver roller 51 rotates, the belt 3 rotates in a direction indicated by arrow A in conjunction with the idler rollers 52, 53, and 54.

Four primary transfer rollers 11a, 11b, 11c, and 11d are disposed opposite the photoconductors 1a, 1b, 1c, and 1d, respectively, via the intermediate transfer belt 3 to form four primary transfer nips therebetween, through each of which the toner image is primarily transferred from the photoconductor 1 to the belt 3. A secondary transfer roller 17 is disposed opposite the belt support roller 51 via the intermediate transfer belt 3 to form a secondary transfer nip therebetween, through which the toner image is secondarily transferred from the belt 3 to a recording medium, such as a sheet of paper S.

Additionally, a belt cleaner 20 may be disposed opposite the belt-support roller 52 to remove untransferred, residual toner particles that remain on the belt surface after secondary image transfer.

In the present embodiment, the intermediate transfer belt 3 comprises a looped belt composed of one or more layers of material. In the case of a mono-layered belt, the belt material may be selected from polyvinylidene difluoride (PVDF), polycarbonate (PC), and polyimide (PI). In the case of a poly-layered belt, the belt may be formed of a substrate of relatively rigid fluorine rubber, PVDF, or polyimide resin, with a smooth coating of fluorine resin deposited on the substrate.

In the present embodiment, the belt support roller 52 located immediately downstream from the primary transfer nip in the belt rotation direction A comprises a tension roller equipped with a biasing member 52a that elastically biases the roller 52 outward, that is, away from other belt support rollers 51 and 53, so as to maintain proper tension in the belt 3 for effective imaging performance, such as, for example, conveyance of the recording medium S. The biasing member 52a may be formed of any suitable elastic material, such as a coil spring, a leaf spring, a rubber band, or the like.

In the present embodiment, the belt support roller 53 located immediately downstream from the tension roller 52 in the belt rotation direction A comprises a displaceable roller that can be displaced relative to the imaging stations depending on a mode of operation in which the image forming apparatus 100 operates, including, for example, full-color printing mode and monochrome printing mode.

In the present embodiment, the belt cleaner 20 includes a cleaning blade 21 of suitable material, such as urethane, held against the belt 3 to mechanically remove or scrape toner residues from the belt surface. Alternatively, instead of or in combination with a cleaning blade, any suitable cleaning device may be used to clean the intermediate transfer belt 3, including, for example, an electrostatic cleaning device that incorporates an electrically conductive fur brush for electrostatically removing toner residues from the belt surface.

At the bottom of the apparatus 100 lies a sheet tray 14 accommodating a stack of recording sheets S. A feed roller 15 is disposed at an outlet of the sheet tray 14 to advance the recording sheet S in a direction indicated by arrow C into a sheet conveyance path defined by a suitable sheet conveyance device, including, for example, a movable belt entrained around a plurality of belt support rollers.

Along the sheet conveyance path is a pair of registration roller 16 for introducing the recording sheet S into the secondary transfer nip. A fixing device 18 is disposed downstream from the secondary transfer nip, which includes, for example, a movable belt entrained around a plurality of belt support rollers to fix the toner image on the recording sheet S. The sheet conveyance path terminates in an output unit including a pair of output rollers 19, which outputs the recording sheet S from inside the apparatus body.

During operation, in each imaging station, the photoconductor 1 rotates to forward its outer, photoconductive surface to a series of electrophotographic processes, including charging, exposure, development, transfer, and cleaning, in one rotation of the photoconductor 1.

First, after being exposed to light radiation from the discharging device, which removes residual electrical charges for initialization, the photoconductive surface is uniformly charged, for example, to a negative potential by the charging device 8 and subsequently exposed to a modulated laser beam L emitted from the exposure device 9. The laser exposure selectively dissipates the charge on the photoconductive surface to form an electrostatic latent image thereon according to image data representing a particular primary color. Then, the latent image enters the development device 10, which renders the incoming image visible using toner. The toner image thus obtained is forwarded to the primary transfer nip between the intermediate transfer belt 3 and the primary transfer roller 11.

At the primary transfer nip, the primary transfer roller 11 is supplied with a bias voltage of a polarity opposite that of the toner on the photoconductor 1 (for example, a positive bias voltage where the toner assumes a negative charge). This electrostatically transfers the toner image from the photoconductive surface to an outer surface of the belt 3, with a certain small amount of residual toner particles left on the photoconductive surface. Such transfer process occurs sequentially at the four primary transfer nips along the belt travel path, so that toner images of different colors are superimposed one atop another to form a single multicolor image on the surface of the intermediate transfer belt 3.

After primary transfer, the photoconductive surface enters the cleaning device 12 to remove residual toner, and then to the discharging device to remove residual charges for completion of one imaging cycle. At the same time, the intermediate transfer belt 3 forwards the multicolor image to the secondary transfer nip between the belt support roller 51 and the secondary transfer roller 17.

Meanwhile, in the sheet conveyance path, the feed roller 15 rotates to introduce a recording sheet S from the sheet tray 14 toward the pair of registration rollers 16 being rotated. Upon receiving the fed sheet S, the registration rollers 16 stop rotation to hold the incoming sheet S therebetween, and then advance it in sync with the movement of the intermediate transfer belt 3 to the secondary transfer nip. At the secondary transfer nip, the multicolor image is transferred from the belt 3 to the recording sheet S, with a certain small amount of residual toner particles left on the belt surface.

After secondary transfer, the intermediate transfer belt 3 enters the belt cleaner 20, which removes residual toner from the intermediate transfer belt 3. At the same time, the recording sheet S bearing the powder toner image thereon is introduced into the fixing device 20, which fixes the multicolor image in place on the recording sheet S with heat and pressure.

Thereafter, the recording sheet S is output by the output rollers 19 for stacking outside the apparatus body, which completes one operational cycle of the image forming apparatus 100.

A description is now given of specific features of the image forming apparatus 100 according to one or more embodiments of this patent specification. In each of these embodiments, a belt tracking system 40 is described employed in a multi-roller belt support assembly, which is applicable to the intermediate transfer device, the sheet conveyance device, and the fixing device included in the image forming apparatus 100.

Figure 2A:
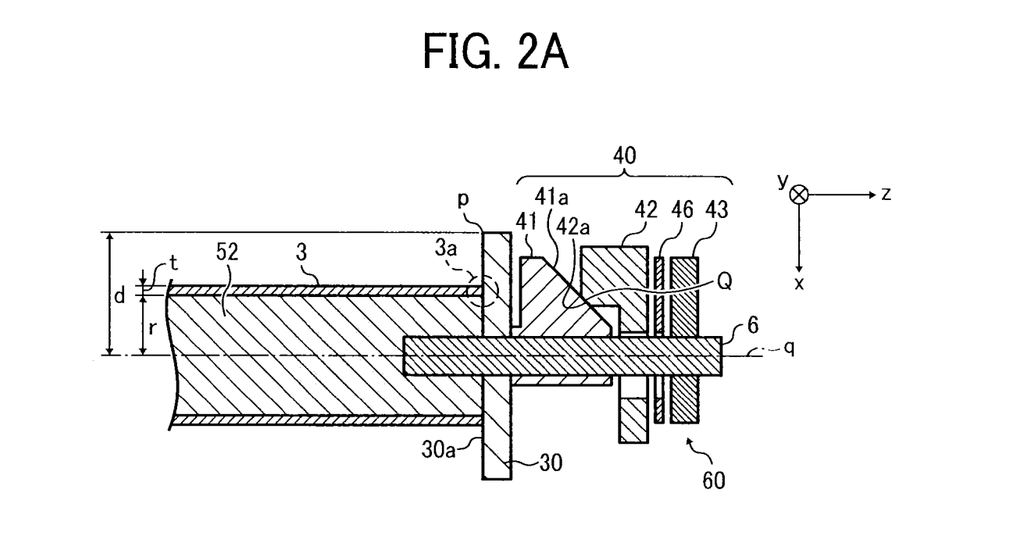
FIGS. 2A and 2B are cross-sectional views of a belt tracking system according to one embodiment of this patent specification.
Figure 2B:
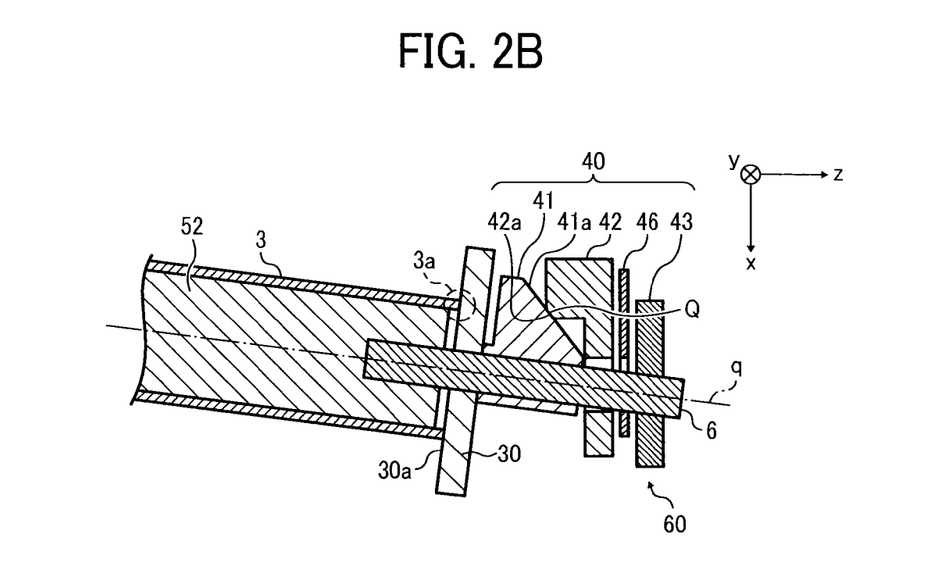

FIGS. 2A and 2B are cross-sectional views of the belt tracking system 40 according to one embodiment of this patent specification, exemplarily provided in the intermediate transfer device included in the image forming apparatus 100 of FIG. 1.

As shown in FIGS. 2A and 2B, the intermediate transfer belt 3 is entrained about the plurality of generally parallel rollers 51 through 54, of which only one specific roller 52 is visible, for moving in a trans-axial direction perpendicular to an axial direction Z in which the rollers extend parallel to each other. The belt tracking system 40 is operatively connected to an axial end of the roller 52 (hereinafter occasionally referred to as a "steering roller") to control the lateral position of the belt 3 by inclining the roller 52 with respect to others of the plurality of generally parallel rollers.

As used herein, the term "axial direction" refers to a reference, longitudinal direction in which a central, rotational axis of the roller extends in its normal operational position, as indicated by the axis Z in the drawings. The terms "inward" and "outward", when used in connection with the axial direction, indicates an element moves or otherwise changes in position, size, and/or shape toward and away from, respectively, an axial, longitudinal center of the roller. The term "trans-axial direction" refers to a given direction perpendicular to the axial direction Z in which the belt is movable, as indicated by the axes X and Y in the drawings. In the present embodiment, for example, the trans-axial directions X and Y are vertical and horizontal, respectively.

The belt tracking system 40 includes a roller shaft 6 extending outward in the axial direction Z from the axial end of the roller 52, a stationary member 42 fixed in position adjacent to the roller shaft 6 to define a first interfacial surface 42a therealong, and a slidable member 41 co-movably coupled with the roller shaft 6 to define a second interfacial surface 42 therealong inclined relative to the axial direction Z. The slidable member 41 is slidable against the stationary member 42 along the interfacial surfaces 41a and 42a to cause the roller shaft 6 to move in a direction perpendicular to the axial direction Z as the belt 3 moves laterally outward in the axial direction Z.

Also included in the belt tracking system 40 is a biasing mechanism 60 connected to the roller shaft 6 to press the slidable member 41 against the stationary member 42 to maintain continuous contact between the first and second interfacial surfaces 42a and 41a. Specific configuration of the biasing mechanism 60 and its associated structure will be described later in more detail with reference to FIGS. 6A and 6B and subsequent drawings.

Additionally, a positioning flange 30 may be operatively connected to the axial end of the roller 52, which defines a contact surface 30a therealong extending generally perpendicular to the axial direction Z to contact an adjoining edge 3a of the belt 3.

In the present embodiment, the roller shaft 6 comprises a cylindrical body with a diameter smaller than that of the steering roller 52, which is coaxially mounted with the roller 52 to integrally rotate with the roller 52. The roller shaft 6 penetrates at least partially into the roller 52 axially inward from the flange 30, and through the slidable member 41 and the stationary member 42 axially outward from the flange 30.

The stationary member 42 comprises a stationary structure having an opening defined therein through which the roller shaft 6 is inserted. The stationary member 42 is positioned axially outward from, and in contact with, the slidable member 41. The stationary member 42 does not move in the axial direction Z upon displacement of the roller shaft 6 and the slidable member 41.

The interfacial surface 42a of the stationary member 42 comprises any surface, such as a chamfered edge, positioned adjacent to the roller shaft 6 to contact the interfacial surface 41a of the slidable member 41.

The slidable member 41 comprises an attachment having a through-hole defined therein for passing the roller shaft 6 therethrough. The slidable member 41 is positioned axially outward from, and in contact with, the flange 30, so that the slidable member 41 may move in the axial direction Z along the roller shaft 6 as the flange 30 moves laterally in the axial direction Z, for example, upon lateral movement of the belt 3. A suitable rotation restrictor may be provided around the slidable member 41 to prevent the slidable member 41 from rotating together with the roller shaft 6.

The interfacial surface 41a of the slidable member 41 comprises any inclined surface, such as a planar surface, a conical surface, or the like, positioned around the roller shaft 6 to contact the interfacial surface 42a of the stationary member 42. In the present embodiment, the inclined surface 41a is disposed on an upper side of the roller shaft 6 and inclined downward toward the stationary member 42 in the axial direction Z. Alternatively, instead, the inclined surface 41a may be disposed on a lower side of the roller shaft 6 and inclined upward toward the stationary member 42 in the axial direction Z.

The positioning flange 30 comprises an annular flange supported on the roller shaft 6 loosely, that is, without being fastened to the roller shaft 6 and the roller 52. Thus, the flange 30 freely rotates around the roller shaft 6 as the belt 3 moves in the trans-axial direction to cause frictional contact between the belt edge 3a and the contact surface 30a. Also, the flange 30 freely moves in the axial direction Z along the roller shaft 6 as the belt 3 moves laterally outward in the axial direction Z to exert pressure from the belt edge 3a against the contact surface 30a.

Compared to holding the flange stationary in position, allowing free rotation of the flange 30 together with the belt 3 reduces load due to friction between the belt edge 3a and the contact surface 30a, thereby preventing damage to the belt 3 and abrasion on the contact surface 30a.

The contact surface 30a of the flange 30 comprises a generally planar, flat surface with a circular peripheral shape concentric with the rotational axis of the roller 52. Alternatively, instead of a flat circular configuration, the contact surface 30a may be configured otherwise as long as the flange 30 properly serves its intended function. Thus, the contact surface 30a includes any generally planar surface, including a curved surface, an irregular surface, or any combination thereof. Further, the peripheral shape of the contact surface 30a includes any closed geometric shape, such as a circle, an ellipse, a rectangle, a polygon, or any combination thereof.

The contact surface 30a may be shaped and dimensioned such that a distance d between a central, rotational axis q of the roller 52 and a periphery p of the contact surface 30a exceeds a sum of a radius r of the roller 52 and a thickness t of the belt 3.

For example, where the assembly is constructed with a roller radius r of 8.78 mm and a belt thickness t of 80 μm, the distance d (which is the radius of the circular contact surface 30a in the present case) may be set to a range greater than 8.86 mm, such as approximately 9.00 mm.

Setting the distance d to an appropriate range ensures the flange 30 properly guides the belt edge 3a to the contact surface 30a without causing undue interference with surrounding structures. Such arrangement effectively prevents substantial displacement or walk of the belt, in which the belt reaches the axial end of the roller and eventually slips off the belt support roller.

During operation, as the driver roller 51 rotates, the belt 3 rotates or moves in the trans-axial direction Y to in turn cause the steering roller 52 to rotate. As the belt 3 moves laterally outward in the axial direction Z along the roller 52, for example, due to a lack of parallel alignment between the belt supporting rollers, the contact surface 30a of the flange 30 contacts the belt edge 3a to prevent further displacement of the belt 3, thereby maintaining the belt 3 in its proper lateral position in the axial direction Z.

Where the belt 3 is in its proper operational position, the belt edge 3a merely touches or slightly contacts the flange 30 with only a small contact pressure applied from the belt edge 3a to the flange 30, which does not cause the flange 30 to move outward in the axial direction Z. At this point, the roller shaft 6 remains in its normal position parallel to the axial direction Z, as shown in FIG. 2A.

Where the belt 3 moves laterally outward in the axial direction Z, the contact pressure from the belt edge 3a to the flange 30 increases to cause the flange 30 to move outward in the axial direction Z against the slidable member 41, so that the slidable member 41 slides downward against the stationary member 42 along the interfacial surfaces 41a and 42a. With the slidable member 41 thus descending, the roller shaft 6, which penetrates through, and therefore is co-movable with, the slidable member 41, is forced downward in the vertical, trans-axial direction X perpendicular to the axial direction Z.

As a result, the steering roller 52, having its one axial end vertically displaced and the other axial end held in position, becomes tilted or inclined relative to other rollers included in the multi-roller assembly, as shown in FIG. 2B. Such inclination of the roller 52 eventually causes the belt 3 to move laterally inward to resume its operational position in the axial direction Z, as described below with additional reference to FIGS. 3A and 3B.

Figure 3A:
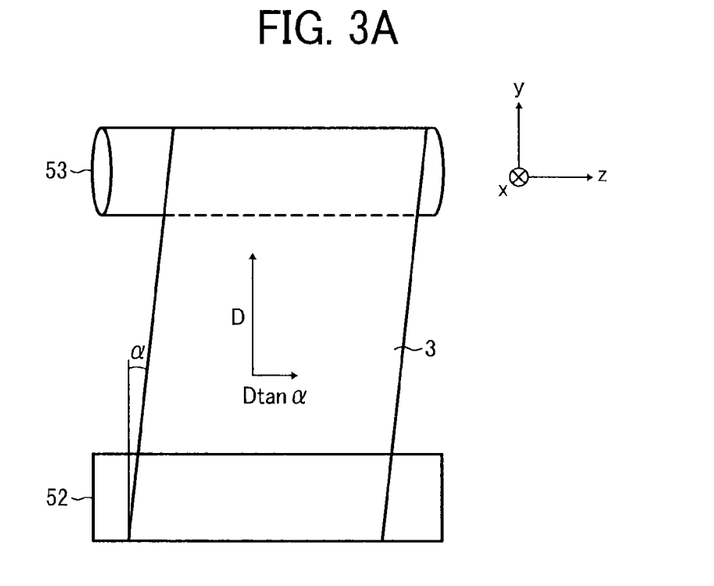
FIGS. 3A and 3B are schematic plan views of a movable belt entrained around multiple rollers inclined relative to each other.

As shown in FIG. 3A, the belt 3 may experience lateral displacement due to a lack of parallel alignment between the two belt support rollers 52 and 53, the former being exactly parallel to the axial direction Z and the latter being slightly tilted away from the axial direction Z (i.e., having its left end closer to the viewer than its right end in the drawing). Thus, the belt 3 has its longitudinal axis angled at a clockwise angle α away from the trans-axial direction Y.

At this point, where the belt 3 travels a distance D in the trans-axial direction Y, a given point on the belt surface moves by an amount D*tan α to one side (i.e., the right side in the drawing) in the axial direction Z.

Figure 3B:
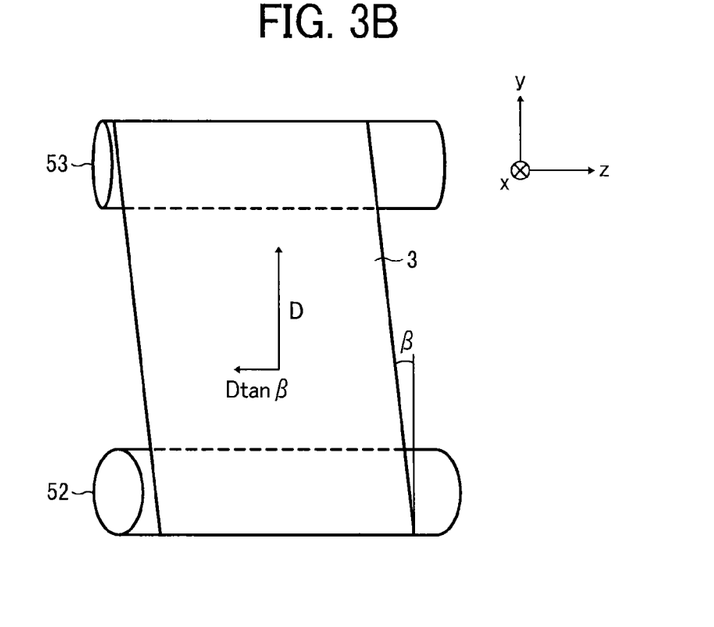

As shown in FIG. 3B, as the lateral displacement of the belt 3 shifts the axial end of the roller 52 in the trans-axial direction X perpendicular to the axial direction Z, the roller 52 becomes angled away from parallel alignment (i.e., having its left end closer to the viewer than its right end in the drawing) whereas the roller 53 remains in its original angular position.

Note that the roller 52 is now tilted away from the axial direction Z at a greater angle than the other roller 53. This difference in tilting angle between the belt support rollers 52 and 53, that is, inclination of the roller 52 with respect to the other roller 53, results in a counterclockwise angle β at which the longitudinal axis of the belt 3 is angled away from the trans-axial direction Y.

At this point, as the belt 3 travels a distance D in the trans-axial direction Y, a given point on the belt surface moves by an amount D*tan β to the side opposite that to which belt displacement took place in the axial direction Z before tilting of the roller 52.

As the amount of displacement D*tan α experienced by the belt 3 to one lateral side is cancelled out by the amount of displacement D*tan β to the other lateral side, the belt 3 can remain within a desired operational position in the axial direction Z to allow for proper functioning of the imaging equipment.

Thus, the belt tracking system 40 corrects lateral displacement of the belt 3 by tilting the steering roller 52 as the slidable member 41 slides against the stationary member 42 along their contact, interfacial surface 41a and 42a where the belt 3 moves laterally outward to the axial end of the roller 52.

The inventors have recognized that, although generally successful, the belt tracking system that employs sliding contact between the slidable member and the stationary member for tilting the steering roller can fail to work properly where the slidable member occasionally separates from the stationary member due to an external force, such as, for example, tension in the movable belt stretched around the belt supporting roller.

Figure 4A:
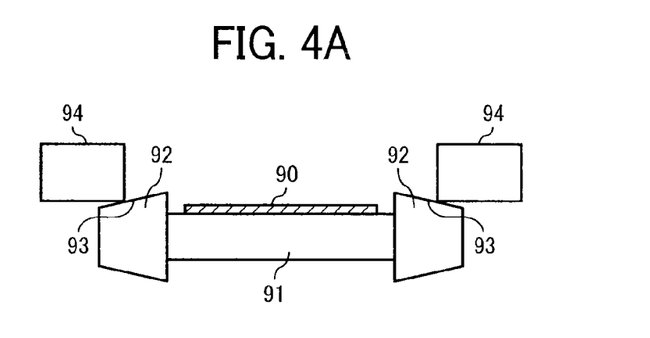
FIGS. 4A and 4B are schematic elevational views of an exemplary belt tracking system.
Figure 4B:
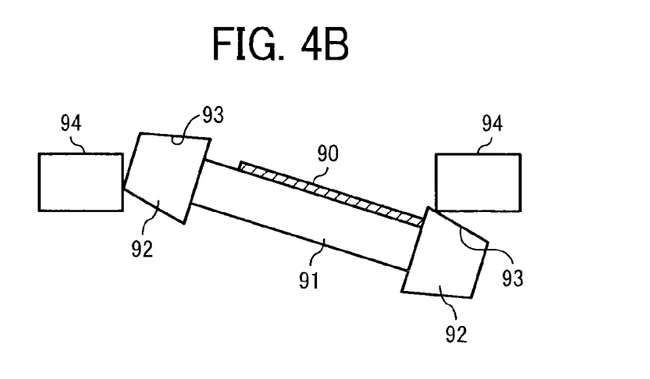

With reference to FIGS. 4A and 4B, consider an exemplary belt tracking system in which a movable belt 90 is entrained around a steering roller 91. The steering roller 91 is equipped with a pair of rotary, slidable members 92 each rotatably mounted to an axial end of the roller 91 to define an inclined, conical interfacial surface 93 therealong to slidably contact a stationary member 94. The system is designed to correct the lateral position of the belt 90 by tilting the roller 91 as the slidable member 92 slides against the stationary member 94 along the inclined interfacial surface 93 where the belt 90 moves laterally outward to the axial end of the roller 91.

Specifically, as shown in FIG. 4A, where the belt 90 is in its neutral, proper operational position, the belt edge does not contact either of the pair of slidable members 92 on the opposed axial ends of the roller 91. At this point, the roller 91 remains in its horizontal position with the slidable members 92 symmetrically located with their interfacial surfaces in contact with the respective stationary members 94.

As shown in FIG. 4B, where the belt 90 is displaced laterally (in this case, to the right side of the drawing), the belt edge contacts and presses against the slidable member 92 on one axial end of the roller 91. As a result, the slidable member 92 on that axial end slides downward against the stationary member 94, whereas the slidable member 92 on the other axial end moves upward, thereby tilting the roller 91 to counteract the lateral displacement of the belt 90.

Figure 5:
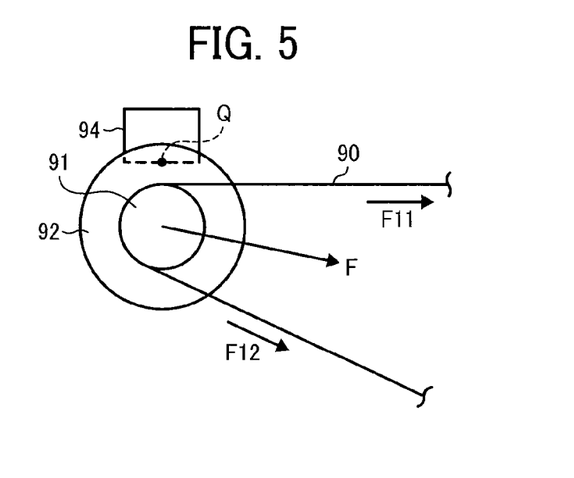
FIG. 5 is an end-on, axial view of the exemplary belt tracking system of FIGS. 4A and 4B.

FIG. 5 is an end-on, axial view of the exemplary belt tracking system of FIGS. 4A and 4B.

As shown in FIG. 5, during operation, the steering roller 91 is subjected to a resultant F of tension or tensile forces F11 and F12 in the belt 90 stretched around the belt supporting roller 91. Where the line of action of the resultant force F is directed away from a point of contact Q between the slidable member 92 and the stationary member 94, the resultant force F can cause the slidable member 92, which moves together with the steering roller 91, to separate from the stationary member 94.

Such a lack of continuous contact between the slidable member 92 and the stationary member 94 results in a failure of the steering roller 91 to tilt upon lateral displacement of the belt 90, leading to a deficient steering function of the belt tracking system.

These and other problems are effectively addressed by the belt tracking system 40 according to this patent specification, owing to provision of the biasing mechanism 60 which presses the slidable member 41 against the stationary member 42 to maintain continuous contact between the first and second interfacial surfaces 42a and 41a.

Figure 6A:
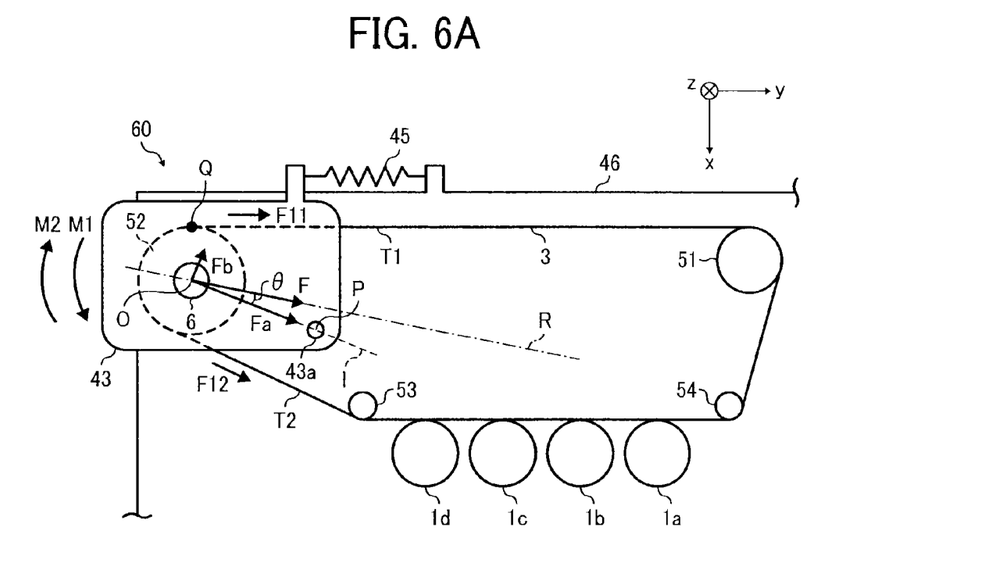
FIGS. 6A and 6B are side elevational views of a multi-roller assembly employing the belt tracking system of FIGS. 2A and 2B.
Figure 6B:
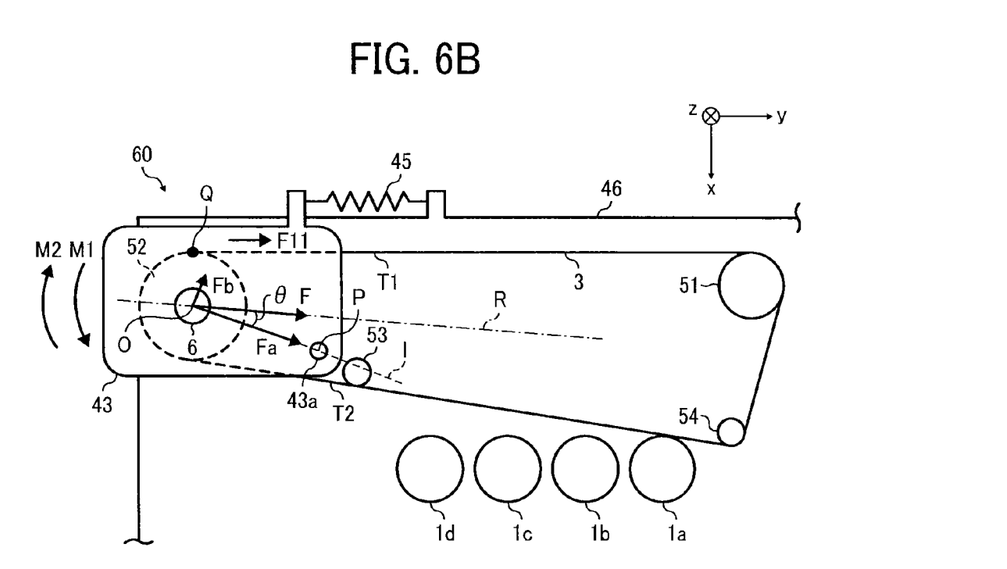

With reference to FIGS. 2A and 2B, as well as FIGS. 6A and 6B, the biasing mechanism 60 in the present embodiment is shown including a stationary support 46 fixed in position, and a swivelable member 43 co-movably coupled with the roller shaft 6, while pivoted at a pivot point P on the stationary support 46.

In the present embodiment, the stationary support 46 comprises a stationary structure having an opening defined therein through which the roller shaft 6 is inserted. The stationary support 46 is positioned axially outward from the stationary member 42. The stationary support 46 does not move in the axial direction Z where the roller shaft 6 moves or is displaced.

The swivelable member 43 comprises a positioning lever mounted to the roller shaft 6 via a bearing. The swivelable member 43 is located axially outward from the stationary support 46. A hinge or pivot 43a is provided between the stationary support 46 and the swivelable member 43 around which the swivelable member 43 rotates as the roller shaft 6 moves in a direction perpendicular to the axial direction Z.

In such a configuration, the biasing mechanism 60 converts a resultant F of tension or tensile forces F11 and F12 in the belt 3 acting on the roller 52 into a biasing force acting on the swivelable member 43 to mechanically bias the slidable member 41 against the stationary member 42.

Specifically, in the present embodiment, the biasing force converted from the resultant force F exerts a torque, or moment of force, on the swivelable member 43 around the pivot point P, which in turn forces the roller shaft 6 in a direction angled relative to a line of action R of the resultant force F.

More specifically, given that an imaginary straight line 1 drawn from a center O of the roller shaft 6 toward the pivot point P is at an angle θ relative to the line of action R, the resultant force F is resolved into two components Fa and Fb, respectively, the former being parallel with the imaginary line 1 and having a magnitude of F*cos θ, and the latter being perpendicular to the imaginary line 1 and having a magnitude of F*sin θ.

Of the two components Fa and Fb of the resultant force F, the force Fb perpendicular to the imaginary line 1 serves as a biasing force that tends to rotate the swivelable member 43 around the pivot point P, which in turn forces the roller shaft 6 in a direction angled relative to the line of action R such that the slidable member 41, co-movably coupled with the roller shaft 6, is forced toward the stationary member 42.

The line of action R of the resultant force F may vary depending on specific configuration. For example, where the pair of tensile forces F11 and F12 acting on the roller shaft 6 are equal in magnitude to each other, the line of action R may be equidistant from two planes T1 and T2 tangential to the roller 52, one being substantially coplanar with the belt surface immediately upstream from the roller 52, and the other being substantially coplanar with the belt surface immediately downstream from the roller 52. In that case, the line of action R bisects an angle formed by the two tangential planes T1 and T2.

In the present embodiment, the pivot point P is positioned opposite a point of contact Q between the first and second interfacial surfaces 42a and 41a with respect to the line of action R of the resultant force F. With the pivot point P thus positioned, the resultant biasing force Fb effectively forces the swivelable member 43, as well as the roller shaft 6 and the slidable member 41 co-movable therewith, toward the point of contact Q between the interfacial surfaces 42a and 41a.

Such arrangement allows the biasing mechanism 60 to reliably maintain continuous contact between the interfacial surfaces of the slidable member 41 and the stationary member 42, leading to more effective operation of the belt tracking system 40.

Although in the present embodiment, the pivot point P of the swivelable member 43 is depicted as being located below the line of action R of the resultant force F, it should be noted that the pivot point P may be located on either side of the line of action R depending on the position of the point of contact Q between the interfacial surfaces 42a and 41a, as described below with reference to FIGS. 7A and 7B.

Figure 7A:
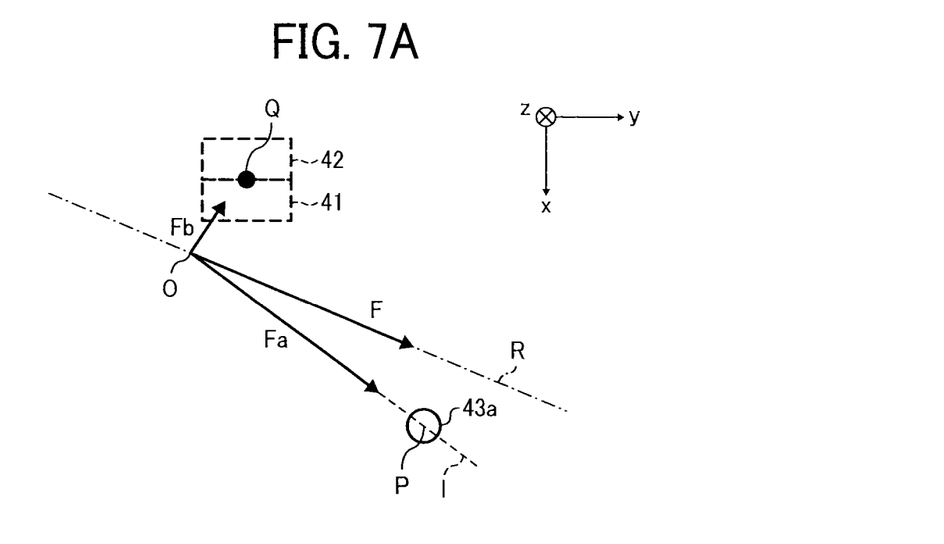
FIGS. 7A and 7B are schematic views illustrating positioning of a pivot point of a swivelable member included in the belt tracking system of FIGS. 6A and 6B.

For example, as shown in FIG. 7A, where the point of contact Q is located vertically above the line of action R, the pivot point P is located vertically below the line of action R. In such cases, the biasing force Fb exerts a generally upward torque on the swivelable member 43 around the pivot point P, such that the slidable member 41 is forced upward toward the slidable member 42 to maintain continuous contact between their interfacial surfaces 42a and 41a.

Figure 7B:
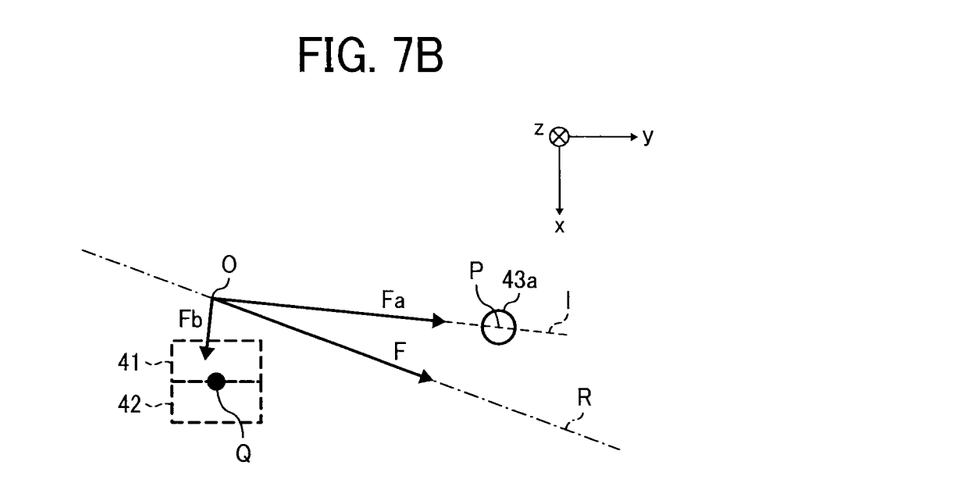

Conversely, as shown in FIG. 7B, where the point of contact Q is located vertically below the line of action R, the pivot point P is located vertically above the line of action R. In such cases, the biasing force Fb exerts a generally downward torque on the swivelable member 43 around the pivot point P, such that the slidable member 41 is forced downward toward the slidable member 42 to maintain continuous contact between their interfacial surfaces 42a and 41a.

With continued reference to FIGS. 6A and 6B, in the present embodiment, at least one of the plurality of generally parallel rollers 51, 52, 53, and 54 is displaceable to change the line of action R of the resultant force F. The pivot point P remains opposite the point of contact Q between the first and second interfacial surfaces 42a and 41a with respect to the line of action R of the resultant force F changing upon displacement of the displaceable roller.

Specifically, as mentioned earlier, the belt support roller 53 located immediately downstream from the tension roller 52 in the belt rotation direction A comprises a displaceable roller that can be displaced relative to the imaging stations depending on a mode of operation in which the image forming apparatus 100 operates, including, for example, full-color printing mode and monochrome printing mode.

For example, in the full-color mode where an image is formed employing all the four primary colors, the displaceable roller 53 is positioned in its first operational position relatively close to the imaging stations to cause the belt 3 to contact all the four photoconductors 1a, 1b, 1c, and 1d, as shown in FIG. 6A.

Conversely, in the monochrome mode where an image is formed employing only the color black, the displaceable roller 53 is positioned in its second operational position relatively far from the imaging stations to cause the belt 3 to contact only the single photoconductor 1a, as shown in FIG. 6B.

Thus, changing the operation mode of the image forming apparatus 100 involves displacement of the displaceable roller 53 relative to the steering roller 52, which in turn changes the angle formed by the tangential planes T1 and T2 along which the belt 3 extends immediately upstream and downstream, respectively, from the roller 52, resulting in a concomitant change in the line of action R of the resultant force F acting on the swivelable member 43.

Note that, in the present embodiment, the pivot point P remains opposite the point of contact Q with respect to the line of action R irrespective of whether the displaceable roller 53 is in its first operational position (FIG. 6A) or in its second operational position (FIG. 6B).

Such arrangement allows the biasing mechanism 60 to reliably maintain continuous contact between the interfacial surfaces of the slidable member 41 and the stationary member 42 regardless of whether the image forming apparatus 100 operates in the monochrome mode or in the full-color mode, leading to more effective operation of the belt tracking system 40.

Figure 8A:
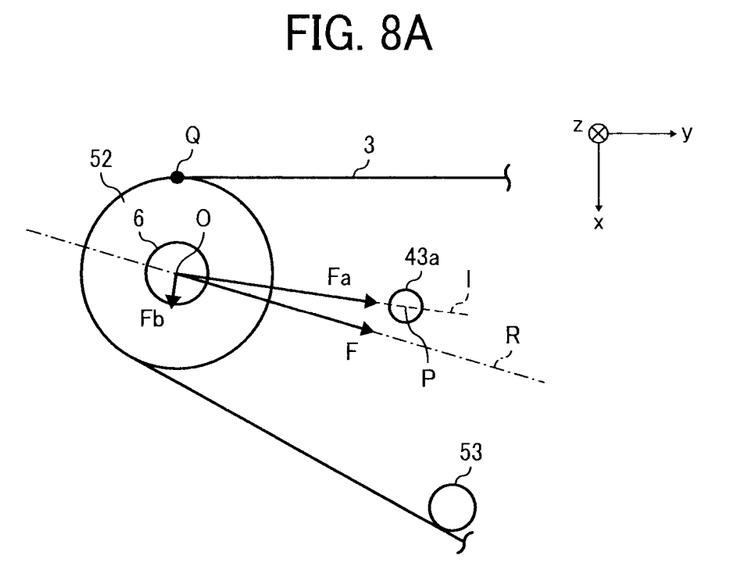
FIGS. 8A and 8B are partial side elevational views illustrating a comparative arrangement of the belt tracking system.
Figure 8B:
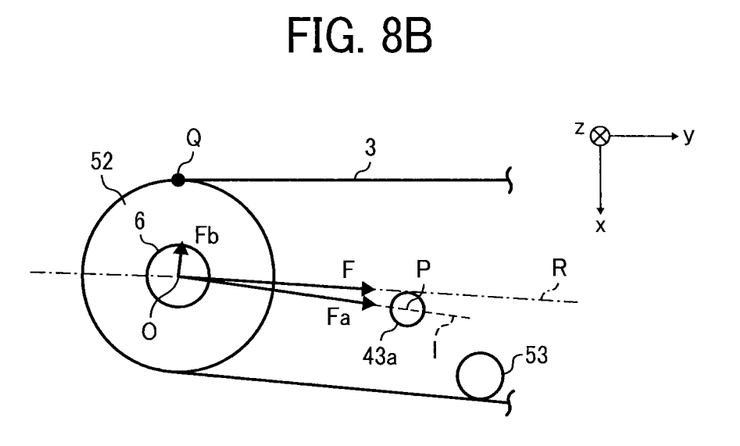

For comparison purposes, and for facilitating a ready understanding of the belt tracking system 40 according to the present embodiment, consider a configuration in which the pivot point P is not always located opposite the point of contact Q between the first and second interfacial surfaces 42a and 41a with respect to the line of action R of the resultant force F.

With reference to FIGS. 8A and 8B, the pivot point P is shown located on the same side as the point of contact Q with respect to the line of action R where the displaceable roller 53 is in its first operational position (FIG. 8A), and opposite the contact point Q with respect to the line of action R where the displaceable roller 53 is in its second operational position (FIG. 8B).

In such cases, the resultant biasing force Fb is directed differently depending on the operational mode of the image forming apparatus, that is, away from the point of contact Q in the full-color mode, and toward the point of contact Q in the monochrome mode. That is, continuous contact between the interfacial surfaces of the slidable member 41 and the stationary member 42 would be lost where the apparatus operates in the full-color mode.

By contrast, the belt tracking system 40 according to the present embodiment can reliably maintain continuous contact between the interfacial surfaces of the slidable member 41 and the stationary member 42, owing to the pivot point P remaining opposite the point of contact Q with respect to the line of action R even where the displaceable roller 53 is displaced, for example, upon a change in the operational mode of the image forming apparatus 100.

Referring back to FIGS. 6A and 6B, the belt tracking system 40 is shown further including an elastic member 45 connected between the swivelable member 42 and the stationary support 46 to elastically retain the roller shaft 6 in position.

In the present embodiment, the elastic member 45 comprises a coil spring disposed in tension between the stationary support 46 and the swivelable member 43. Alternatively, instead of a coil spring, the elastic member 45 may be configured as any suitable elastic material, such as a leaf spring, a rubber band, or the like.

During operation, where the roller shaft 6 moves downward in the vertical, trans-axial direction X for correcting the lateral position of the belt 3, the swivelable member 43 rotates in a first rotational direction M1, counterclockwise in FIGS. 6A and 6B, around the pivot 43a.

As rotation of the swivelable member 43 causes the elastic member 45 to stretch, the resultant elastic force, which opposes the change in length of the elastic member 45, causes the swivelable member 43 to rotate backward in a second rotational direction M2, clockwise in FIGS. 6A and 6B, around the pivot 43a.

Thus, with the elastic member 45 connected between the swivelable member 43 and the stationary support 46, the roller shaft 6, which is co-movable with the swivelable member 43, tends to move upward after being displaced downward in the trans-axial direction X. Such elastic retention of the roller shaft 6 prevents the slidable member 41 from falling off the stationary member 42 due to tension in the belt 3, leading to continuous contact between the interfacial surfaces 41a and 42a of the slidable member 41 and the stationary member 42, which allows for more reliable operation of the belt tracking system 40.

Although a particular configuration has been illustrated, the belt tracking system 40 according to this patent specification may be configured otherwise than that described herein. For example, instead of providing the belt tracking system 40 to only one axial end of a specific roller, the belt tracking system 40 may be operatively connected to each of two axial ends of the roller. Further, the belt tracking system 40 may be provided to more than one of the plurality of generally parallel rollers about which the movable belt is entrained.

Moreover, the belt tracking system 40 may be employed in any type of imaging equipment incorporating a multi-roller belt support assembly, such as an intermediate transfer unit for transferring a toner image from a photoconductive surface, a conveyance unit for conveying a recording medium, and a fixing unit for fixing a toner image in place on a recording medium, included in the image forming apparatus, such as a photocopier, facsimile machine, printer, plotter, or multifunctional machine incorporating several of these features.

In each of those alternative embodiments, various beneficial effects may be obtained owing to provision of the biasing mechanism 60 and other aspects of the belt tracking system 40 according to this patent specification.

Numerous additional modifications and variations are possible in light of the above teachings. It is therefore to be understood that, within the scope of the appended claims, the disclosure of this patent specification may be practiced otherwise than as specifically described herein.

What is claimed is:

1. A belt tracking system for controlling the lateral position of a movable belt entrained about a plurality of generally parallel rollers for moving in a trans-axial direction perpendicular to an axial direction in which the rollers extend parallel to each other, the system comprising:

a roller shaft extending outward in the axial direction from an axial end of a specific one of the plurality of generally parallel rollers;

a stationary member fixed in position adjacent to the roller shaft to define a first interfacial surface therealong;

a slidable member co-movably coupled with the roller shaft to define a second interfacial surface therealong inclined relative to the axial direction, the slidable member being slidable against the stationary member along the interfacial surfaces to cause the roller shaft to move in a direction perpendicular to the axial direction as the belt moves laterally outward in the axial direction; and a biasing mechanism connected to the roller shaft to press the slidable member against the stationary member to maintain continuous contact between the first and second interfacial surfaces.

2. The system according to claim 1, wherein the biasing mechanism includes:

a stationary support fixed in position; and a swivelable member co-movably coupled with the roller shaft, while pivoted at a pivot point on the stationary support.

3. The system according to claim 2, wherein the biasing mechanism converts a resultant of tensile forces in the belt acting on the roller into a biasing force acting on the swivelable member to mechanically bias the slidable member against the stationary member.

4. The system according to claim 3, wherein the biasing force converted from the resultant force exerts a torque on the swivelable member around the pivot point, which in turn forces the roller shaft in a direction angled relative to a line of action of the resultant force.

5. The system according to claim 4, wherein the pivot point is positioned opposite a point of contact between the first and second interfacial surfaces with respect to the line of action of the resultant force.

6. The system according to claim 5, wherein the line of action of the resultant force is equidistant from two planes tangential to the roller, one being substantially coplanar with the belt surface immediately upstream from the roller, and the other being substantially coplanar with the belt surface immediately downstream from the roller.

7. The system according to claim 5, wherein at least one of the plurality of generally parallel rollers is displaceable to change the line of action of the resultant force, the pivot point remaining opposite the point of contact between the first and second interfacial surfaces with respect to the line of action of the resultant force changing upon displacement of the displaceable roller.

8. The system according to claim 2, wherein the biasing mechanism further includes an elastic member connected between the swivelable member and the stationary support to elastically retain the roller shaft in position.

9. The system according to claim 1, wherein the belt tracking system is operatively connected to each of two axial ends of the roller.

10. The system according to claim 1, wherein the belt tracking system is provided to more than one of the plurality of generally parallel rollers.

11. An image forming apparatus employing the belt tracking system according to claim 1.

12. The image forming apparatus according to claim 11, wherein the belt tracking system is incorporated in one of an intermediate transfer unit for transferring a toner image from a photoconductive surface, a conveyance unit for conveying a recording medium, and a fixing unit for fixing a toner image in place on a recording medium.

13. A multi-roller assembly for supporting a movable belt, the assembly comprising:

a plurality of generally parallel rollers about which the movable belt is entrained for moving in a trans-axial direction perpendicular to an axial direction in which the rollers extend parallel to each other; and a belt tracking system operatively connected to an axial end of a specific one of the plurality of generally parallel rollers to control the lateral position of the belt by inclining the roller with respect to others of the plurality of generally parallel rollers, the system including:

a roller shaft extending outward in the axial direction from the axial end of the roller;

a stationary member fixed in position adjacent to the roller shaft to define a first interfacial surface therealong;

a slidable member co-movably coupled with the roller shaft to define a second interfacial surface therealong inclined relative to the axial direction, the slidable member being slidable against the stationary member along the interfacial surfaces to cause the roller shaft to move in a direction perpendicular to the axial direction as the belt moves laterally outward in the axial direction; and a biasing mechanism connected to the roller shaft to press the slidable member against the stationary member to maintain continuous contact between the first and second interfacial surfaces.

14. A belt tracking system for controlling the lateral position of a movable belt, the system comprising:

a steering roller around which the belt is entrained;

a stationary member fixed in position adjacent to an axial end of the roller to define a first interfacial surface therealong;

a slidable member co-movably coupled with the roller axial end to define a second interfacial surface thereal­ong inclined relative to a given axial direction, the slidable member being slidable against the stationary member along the interfacial surfaces to displace the roller axial end in a direction perpendicular to the axial direction as the belt moves laterally outward in the axial direction; and means for pressing the slidable member against the stationary member to maintain continuous contact between the first and second interfacial surfaces.

* * * * *